US009602433B2

(12) United States Patent
Huang et al.

(10) Patent No.: US 9,602,433 B2
(45) Date of Patent: Mar. 21, 2017

(54) SYSTEMS AND METHODS FOR SHARING A SERIAL COMMUNICATION PORT BETWEEN A PLURALITY OF COMMUNICATION CHANNELS

(71) Applicant: QUALCOMM Incorporated, San Diego, CA (US)

(72) Inventors: Xuhao Huang, San Diego, CA (US); Ankit Srivastava, San Diego, CA (US); Xiaohong Quan, San Diego, CA (US); Seyfollah S Bazarjani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 13/841,355

(22) Filed: Mar. 15, 2013

(65) Prior Publication Data

US 2014/0029611 A1    Jan. 30, 2014

Related U.S. Application Data

(60) Provisional application No. 61/676,120, filed on Jul. 26, 2012.

(51) Int. Cl.
*H04L 12/28* (2006.01)
*H04L 12/947* (2013.01)
(Continued)

(52) U.S. Cl.
CPC ........ *H04L 49/25* (2013.01); *H04L 12/40006* (2013.01); *H04L 12/4035* (2013.01); *H04L 25/0272* (2013.01)

(58) Field of Classification Search
CPC ...... H04L 43/50; H04L 12/56; H04N 21/4341
(Continued)

(56) References Cited

U.S. PATENT DOCUMENTS 4,546,470 A * 10/1985 Naylor ................. H04W 84/14
370/315
6,049,530 A *  4/2000 Petersen ............ H04Q 11/0478
370/248

(Continued)

OTHER PUBLICATIONS

International Search Report and Written Opinion—PCT/US2013/052410—ISA/EPO—Dec. 17, 2013.

*Primary Examiner* — Ricky Ngo
*Assistant Examiner* — Christine Ng
(74) *Attorney, Agent, or Firm* — Chui-kiu Teresa Wong; Kenneth Vu

(57) ABSTRACT

An apparatus for sharing a serial communication port between a plurality of communication channels is described. The apparatus comprises a transceiver that manages communications over the serial communication port. The apparatus also includes a multiplexer coupled to the transceiver, wherein the multiplexer multiplexes the plurality of communication channels. The apparatus also includes identification information circuitry coupled to the multiplexer, wherein the identification information circuitry adds identification information to data from the plurality of communication channels that enables the plurality of communication channels to share the serial communication port. The serial communications port and the multiplexer permit communication between integrated circuits that meet at least one latency metric for the plurality of communication channels when the plurality of communication channels are active.

42 Claims, 9 Drawing Sheets

(51) Int. Cl.
    *H04L 12/40*     (2006.01)
    *H04L 12/403*     (2006.01)
    *H04L 25/02*     (2006.01)

(58) Field of Classification Search
    USPC ........................ 370/235, 252, 389, 392, 535
    See application file for complete search history.

(56) References Cited

U.S. PATENT DOCUMENTS

| | | |
|---|---|---|
| 7,009,978 B2 | 3/2006 | Kofoed et al. |
| 7,103,008 B2 | 9/2006 | Greenblat et al. |
| 7,912,074 B2 | 3/2011 | Cantwell |
| 8,255,599 B2 | 8/2012 | Shaikli |
| 2004/0057469 A1* | 3/2004 | Nuss ....................... H04J 3/247 370/535 |
| 2007/0266173 A1* | 11/2007 | Wong ....................... H04L 69/16 709/238 |
| 2008/0104298 A1* | 5/2008 | Liu ..................... G06F 13/4081 710/301 |
| 2009/0080428 A1 | 3/2009 | Witkowski et al. |
| 2009/0103920 A1* | 4/2009 | Liu ....................... H04L 49/351 398/58 |
| 2010/0138857 A1* | 6/2010 | Gondkar .......... H04N 21/23412 725/31 |
| 2010/0322221 A1* | 12/2010 | Tanimoto ............. H04J 3/1623 370/338 |

\* cited by examiner

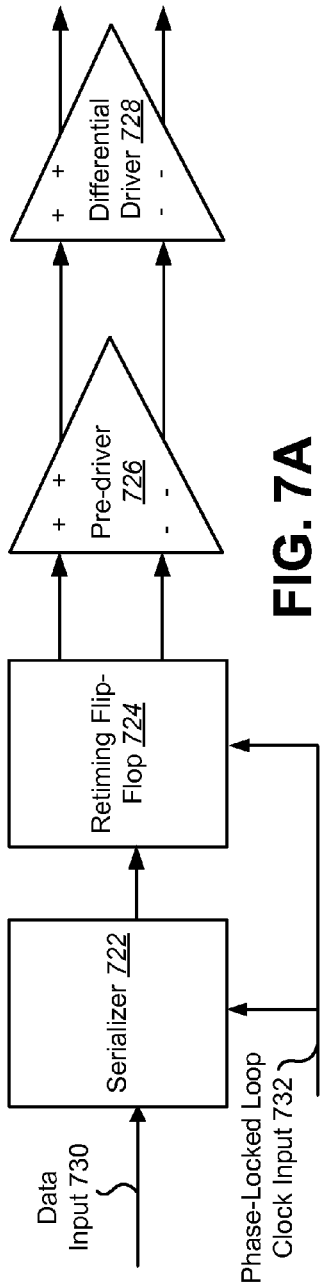
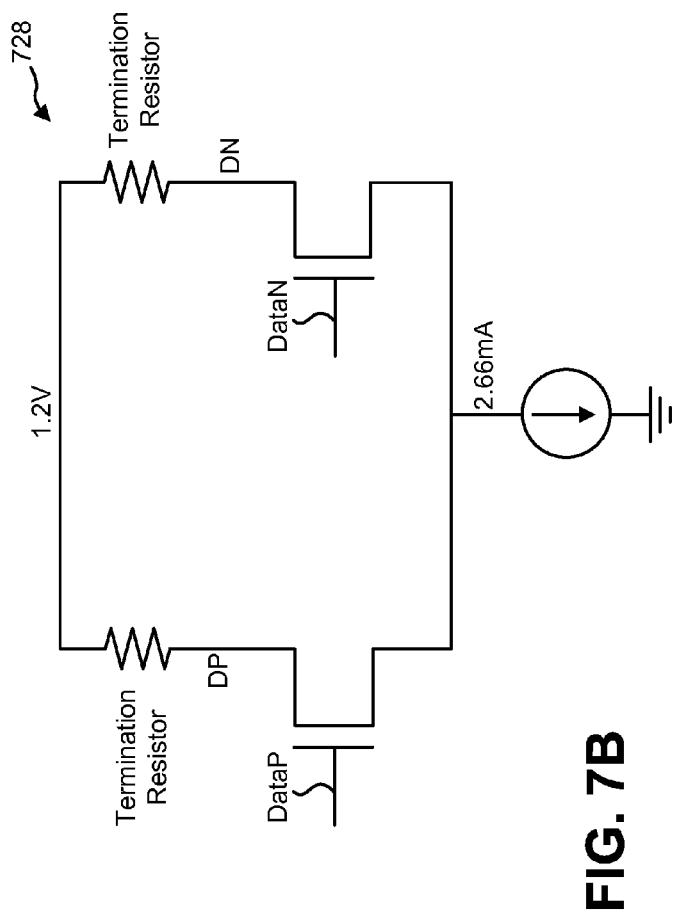
FIG. 7A
FIG. 7B

SYSTEMS AND METHODS FOR SHARING A SERIAL COMMUNICATION PORT BETWEEN A PLURALITY OF COMMUNICATION CHANNELS

CLAIM OF PRIORITY UNDER 35 U.S.C. 119

The present Application for Patent claims priority to Provisional Application No. 61/676,120, entitled "Qlink for chip-to-chip communication" filed Jul. 26, 2012, and assigned to the assignee hereof and hereby expressly incorporated by reference herein.

TECHNICAL FIELD

The present disclosure relates generally to electronic systems. More specifically, the present disclosure relates to systems and methods for sharing a serial communication port between a plurality of communication channels.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

One recurring advancement in electronic device technology is the reduction in size of electronic devices. While this reduction in size may render the electronic devices more convenient, the reduction in size may reduce the space available for the internal componentry. As can be seen from this discussion, systems and methods that improve the spatial requirements of an electronic device may be beneficial.

SUMMARY

An apparatus for sharing a serial communication port between a plurality of communication channels is described. The apparatus includes a transceiver that manages communications over the serial communication port. The apparatus also includes a multiplexer coupled to the transceiver. The multiplexer multiplexes the plurality of communication channels. The apparatus also includes identification information circuitry coupled to the multiplexer. The identification information circuitry adds identification information to data from the plurality of communication channels that enables the plurality of communication channels to share the serial communication port. The serial communications port and the multiplexer permit communication between integrated circuits that meet at least one latency metric for the plurality of communication channels when the plurality of communication channels are active.

The transceiver may include at least one receiver and at least one transmitter grouped together in a high speed clock line serial link of an integrated circuit. The integrated circuits may include a modem and a wireless communication chip. The apparatus may be positioned on an integrated circuit. The plurality of communication channels may be wire line channels. The plurality of communication channels may correspond to a plurality of communication standards. The plurality of communication channels may correspond to a plurality of instances of a communication standard. The plurality of communication channels may correspond to physical layer standards.

The identification information may identify a communication standard. The at least one latency metric may include a metric for determining whether an integrated circuit transmits data. The metric may correspond to a communication channel property. The integrated circuit may transmit data when the communication channel property is greater than the metric. The at least one latency metric may include a bandwidth metric. The at least one latency metric may include a data transfer rate metric. The at least one latency metric may not include a buffering metric. The integrated circuits may be in a chip-to-chip configuration.

A method for sharing a serial communication port between a plurality of communication channels by an apparatus is described. The method includes managing communications over the serial communication port. The method also includes multiplexing the plurality of communication channels. The method also includes adding identification information to data from the plurality of communication channels that enables the plurality of communication channels to share the serial communication port. The method further includes permitting communication between integrated circuits that meet at least one latency metric for the plurality of communication channels when the plurality of communication channels are active.

A computer-program product for sharing a serial communication port between a plurality of communication channels is described. The computer-program product includes a non-transitory tangible computer-readable medium having instructions. The instructions include code for causing an apparatus to manage communications over the serial communication port. The instructions also include code for causing the apparatus to multiplex the plurality of communication channels. The instructions also include code for causing the apparatus to add identification information to data from the plurality of communication channels that enables the plurality of communication channels to share the serial communication port. The instructions also include code for causing the apparatus to permit communication between integrated circuits that meet at least one latency metric for the plurality of communication channels when the plurality of communication channels are active.

An apparatus for sharing a serial communication port between a plurality of communication channels is described. The apparatus includes means for managing communications over the serial communication port. The apparatus also includes means for multiplexing the plurality of communication channels. The apparatus also includes means for adding identification information to data from the plurality of communication channels that enables the plurality of communication channels to share the serial communication port. The apparatus also includes means for permitting communication between integrated circuits that meet at least one latency metrics for the plurality of communication channels when the plurality of communication channels are active.

BRIEF DESCRIPTION OF THE DRAWINGS

FIG. 7A is a block diagram illustrating one configuration of transmitter circuitry in which systems and methods for sharing a serial communication port between a plurality of communication channels may be implemented;

FIG. 7B illustrates one configuration of a differential driver;

DETAILED DESCRIPTION

Figure 1:
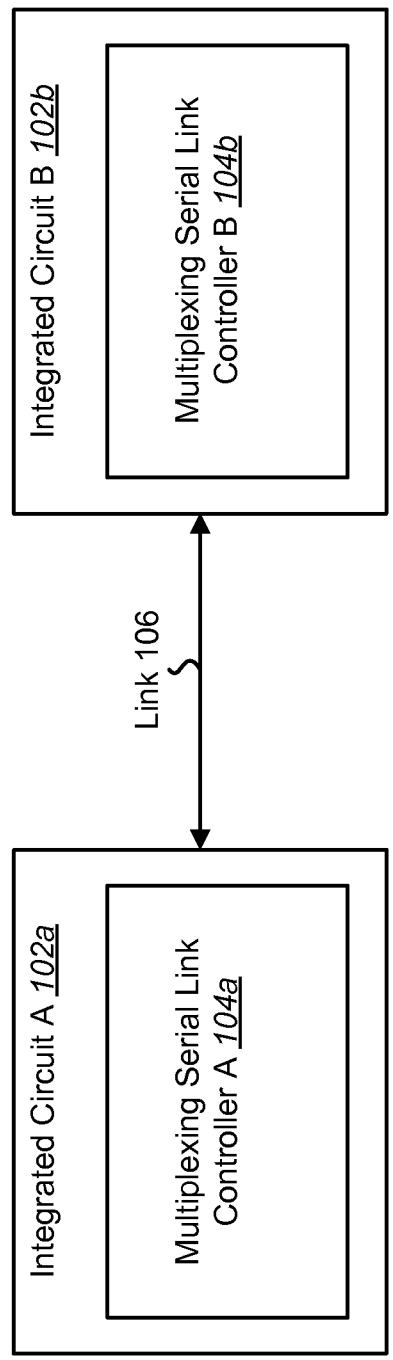
FIG. 1 is a block diagram illustrating one configuration of integrated circuits in which systems and methods for sharing a serial communication port between a plurality of communication channels may be implemented.

The 3rd Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Examples of communication devices include cellular telephone base stations or nodes, access points, wireless gateways, wireless routers, laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

For analog macros, such as physical layer (PHY) macros, there may not be much advantage from device scaling. In this scenario, it may be desirable to have an analog chip that does not scale with a technology node (e.g., an electronic device) and contains physical layer protocols for different standards. For example, communication via a parallel bus with the different physical layer channels may be problematic as it requires too many pins for a mobile station modem (MSM). By comparison, communication via a serial bus may be a better solution, but may require many pins if there are many physical layer channels.

For a five gigabyte per second serial link, a ten centimeter link may have negligible attenuation and inter-symbol interference (ISI) and thus a ten gigabytes per second (or higher) communication link may be designed. In this example, clock data recovery design and the receiver design for the serial link may be relaxed as there are no stringent Jitter requirements and the eye is wide open.

The present disclosure describes a physical layer wrapper that may multiplex serial data to the individual physical layers. In some configurations, a high speed transceiver, with a transmitter, receiver and phase-locked loop (PLL) may transit the serial data. A corresponding wrapper may be included to receive the multiplexed serial data. The wrapper may add overhead to allow proper communication between chips for burst mode communication. In one configuration, the latency required for a serial link may be approximately 102 bits (e.g., 8 bits for a serializer, 80 bits for clock data recovery and 14 bits for first-in first-out (FIFO) and a de-serializer). In this example, the channel is assumed to be up to ten centimeters. Additional pins may be added. For example, a transmit positive (TXP), a transmit negative (TXN), a receive positive (RXP) and receive negative (RXN) may be added. Additionally a reference resistor pin (Rext) and a temperature compensated crystal oscillator (TXCO) may be shared.

The systems and methods disclosed herein may result in a lower pin count on a chip, e.g., a mobile station modem. Additionally, one serial link may potentially support multiple physical layer channels. In other words, due to multiplexing, one serial link can support multiple physical layer channels. As the transmit driver power does not always scale with the data rate, the current methods and systems may result in lower power consumption. As only the serial link may need to port to new technology, instead of the various physical layer channels for different standards, the present disclosure may include a faster time to market. Additionally, devices implementing the systems and methods disclosed herein may be small compared to devices having multiple physical layers on a mobile station modem or having multiple serial transceivers.

In an example of a transmitter architecture a differential driver may include a 50Ω current mode driver. This may result in a 65 mV amplitude swing to 3.2 mW (2.66 mA). The differential driver may include a 50Ω voltage driver. This driver may be an option to increase output voltage swing. In some cases, speed may be a challenge. The latency for the transmitter path may be approximately eight bits.

In an example of a receiver architecture, a clock recovery circuit may operate at 1.25 gigahertz to reduce lock time. The lock time for clock data recovery may be 64 bits. The byte boundary alignment latency estimate may be 16 bits. The deserializer latency estimate may be 8 bits. In this example an elasticity buffer may be needed after the clock data recovery to de-skew multiple lanes and compensate short term phase-locked loop drift. In this example, the latency for the elasticity buffer estimate may be 6 bits. For the receiver architecture, the total latency may be 94 bits.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. Features and/or elements depicted in a Figure may be combined with one or more features and/or elements depicted in one or more other Figures.

FIG. 1 is a block diagram illustrating one configuration of integrated circuits 102a-b in which systems and methods for sharing a serial communication port between a plurality of communication channels may be implemented. Examples of integrated circuits 102a-b may include a modem and an analog chip. In some implementations, at least one of the integrated circuits 102a-b may be a wireless communication chip. In this example, the wireless communication chip may be positioned in a wireless communication device (e.g., a smart phone). In some implementations, the integrated circuits 102a-b may be positioned on a printed circuit board. For example, the integrated circuits 102a-b may be positioned on a printed circuit board of a mobile device (e.g., a smartphone). In some configurations, the integrated circuits 102a-b may be set up in a chip-to-chip configuration.

In some implementations, the integrated circuits 102a-b may include elements that allow communication with other integrated circuits 102a-b. For example, an integrated circuit 102a-b may include memory to store data. As will be described in detail below, the integrated circuit 102a-b may include at least one transmitter and at least one receiver to transmit and/or receive data to/from other integrated circuits 102a-b. The elements that allow communication may permit communications with other integrated circuits 102a-b when at least one latency metric is met. For example, the integrated circuit 102a-b may communicate with another integrated circuit 102a-b when the latency metrics for the communication channels are met. Examples of latency metrics include a bandwidth metric and a data transfer rate metric. In some implementations, the integrated circuits 102a-b may not be scaled for use in different electronic devices. For example, an integrated circuit 102a-b as disclosed herein may be used in electronic devices of different shapes and sizes.

In some implementations, the integrated circuits 102a-b may be coupled together via a link 106. The link 106 may allow the integrated circuits 102a-b to transmit and/or receive data to/from other integrated circuits 102a-b. In some implementations, the link 106 may join at least one receiver and at least one transmitter. For example, the link 106 may be a high speed clock line serial link that joins a transmitter and a receiver of an integrated circuit 102a-b. The high speed clock line serial link may join multiple transmitters and multiple receivers. In some implementations, the link 106 may be a serial communication link 106.

The link 106 may transmit data from a plurality of communication channels. For example, the link 106 may transmit a multiplexed channel that includes a plurality of communication channels. The plurality of communication channels may correspond to a plurality of communication standards. For example, a first communication channel may correspond to a universal serial bus (USB) communication standard. A second communication channel may correspond to a peripheral component interconnect express (PCIe) communication standard. In this example, the first communication channel and the second communication channel may be multiplexed and transmitted via the link 106. The present systems and methods may also be applied to radio frequency (RF) baseband, CODEC and other applications.

The multiplexed communication channels transmitted via the link 106 may correspond to a plurality of instances of a communication standard. For example a first communication channel and a second communication channel may correspond to different instances of a universal serial bus communication standard. As described above, the first and second communication channels may be multiplexed and transmitted via the link 106.

The link 106 may permit real-time transmission and/or reception between the integrated circuits 102a-b. In other words, the link 106 may allow a plurality of communication channels to be transmitted via the link 106 without buffering. In some configurations, the link 106 may transmit and/or receive data when the latency metrics for the communication channels are met. For example, if the first communication channel and the second communication channel are based on a universal serial bus communication standard that has a data transfer rate latency metric of 480 megabytes per second, the link 106 may transfer and/or receive data when the link 106 meets the data transfer rate latency metric for both the first communication channel and the second communication channel. In other words, the link 106 may transmit data when the link 106 supports a data transfer rate of at least 960 megabytes per second.

For example, a first communication channel may be transmitting via the link 106 based on a universal serial bus communication standard that has a data transfer rate latency metric of 480 megabytes per second. A second communication channel may then desire to transmit data based on a universal serial bus communication standard. In this example, the second communication channel may transmit via the link 106 without buffering if the link 106 supports a data transfer rate of at least 960 megabytes per second. In this example, the first communication channel and the second communication channel may be multiplexed together and transferred in a multiplexed channel. Similarly, if a first communication channel and a second communication channel pertain to communication standards with bandwidth latency metrics, the link 106 may allow for real-time, or near real-time, communication if the link has a total bandwidth at least equal to the first communication channel bandwidth latency metric and the second communication channel bandwidth latency metric. Furthermore, the present systems and methods may allow more than two communication channels to transmit on a serial communication link where the link has a total bandwidth sufficient to comply with the communication channel latency metrics for all the communication channels.

The integrated circuits 102a-b may also include a multiplexing serial link controller 104a-b. The multiplexing serial link controller 104a-b may multiplex a plurality of communication channels to be transmitted via the link 106. For example, the multiplexing serial link controller 104a-b may multiplex data streams corresponding to a plurality of communication channels into a multiplexed channel to be transmitted via the link 106 (e.g., a high speed clock line serial link).

In some implementations, the multiplexing serial link controllers 104a-b may add identification information to the data included in the plurality of communication channels. For example, the multiplexing serial link controllers 104a-b may add a first header to a first communication channel that identifies the first communication channel as corresponding to a first communication standard (e.g., a universal serial bus communication standard). Similarly, the multiplexing serial link controllers 104a-b may add a second header to a second communication channel that identifies the second communication channel as corresponding to a second communication standard (e.g., a peripheral component interconnect express communication standard). In this example, the multiplexing serial link controllers 104a-b may multiplex the first communication channel and the second communication channel that enables them to share the link 106.

In some implementations, the multiplexing serial link controllers 104a-b may support a plurality of communication standards. For example, the multiplexing serial link controllers 104a-b may include information pertaining to a plurality of communication standards. In this example, the multiplexing serial link controllers 104a-b may add that information in a header to be included with a communication channel to identify the communication standard that a communication channel is based on.

In some implementations, the multiplexing serial link controllers 104a-b may permit the integrated circuits 102a-b to transmit/receive data to/from another integrated circuit 102a-b based on latency metrics. For example, the multiplexing serial link controllers 104a-b may determine whether the properties of the link 106 meet the latency metrics of the plurality of communication channels. If the properties of the link 106 meet the latency metrics of the plurality of communication channels, the multiplexing serial link controllers 104a-b may permit the data to be transmitted/received via the link 106. For example, if a first communication channel and a second communication channel are based on a universal serial bus communication standard that has a data transfer rate latency metric of 480 megabytes per second, then the multiplexing serial link controller 104a-b may permit transmission/reception of data when the link 106 meets the data transfer rate latency metric for both the first communication channel and the second communication channel. In other words, the multiplexing serial link controllers 104a-b may permit data transfer/reception when the link 106 permits a data transfer rate of at least 960 megabytes per second.

Figure 2:
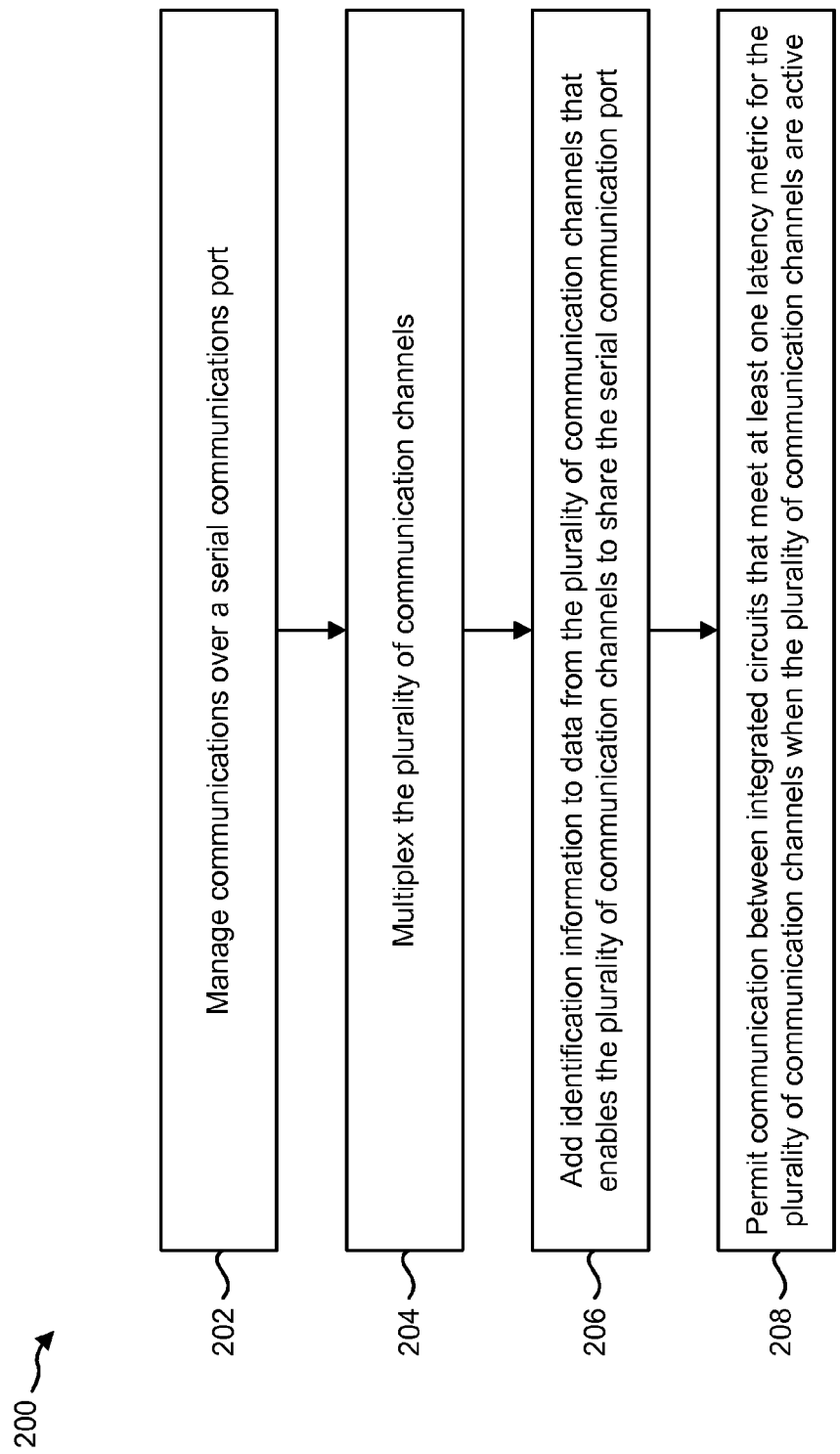
FIG. 2 is a flow diagram illustrating one configuration of a method for sharing a serial communication port between a plurality of communication channels.

FIG. 2 is a flow diagram illustrating one configuration of a method 200 for sharing a serial communication port between a plurality of communication channels. The method 200 may be performed by integrated circuits 102a-b. The integrated circuits 102a-b may manage 202 communications over a serial communication port. In some implementations, the serial communication port may be an example of the link 106 described earlier. More specifically, a transceiver (not shown) of the integrated circuits 102a-b may manage 202 communications over the serial communication port. The transceiver may include a transmitter and a receiver. For example, the transmitter of the transceiver may manage transmission of data over the serial communication port. Similarly, the receiver of the transceiver may manage reception of data over the serial communication port.

In some implementations, the transceiver may manage 202 communications with one or more other integrated circuits 102a-b. The transceiver may manage 202 communications with another integrated circuit 102a-b on the same electronic device, for example in a chip-to-chip configuration. The transceiver may also manage 202 communications with an integrated circuit 102a-b on another electronic device. For example, the transceiver may be on a first integrated circuit 102a-b on a first electronic device. In this example, the transceiver may manage 202 communications with a second integrated circuit 102a-b that may be positioned on a second electronic device. In some implementations, the integrated circuit 102a-b may manage 202 communications over the serial communication port with multiple integrated circuits 102a-b.

In some implementations, managing 202 communications over the serial communication port may include managing a plurality of communication channels. For example, the transceiver may transmit data corresponding to a plurality of communication channels. In some implementations, the communication channels may be wire line channels. In other implementations, the communication channels may be radio frequency (RF) channels. The plurality of communication channels may correspond to a plurality of communication standards. The communication standards may be physical layer standards. For example, a first communication channel may correspond to a first communication standard (e.g., a universal serial bus communication standard). Similarly, a second communication channel may correspond to a second communication standard (e.g., a peripheral component interconnect express communication standard). In this example, the integrated circuits 102a-b may manage 202 the plurality of communication channels. In some implementations, the plurality of communication channels may correspond to a plurality of instances of a communication standard. For example, a first communication channel may correspond to a communication standard (e.g., a universal serial bus communication standard). Similarly, a second communication channel may correspond to another instance of the same communication standard (e.g., a universal serial bus communication standard). In some implementations, the number of communication channels that are managed may be greater than the number of communication ports. For example, the integrated circuits 102a-b may manage a plurality of communication channels. In this example, the communication channels may transmit/receive data over one serial communication port.

In some implementations, managing 202 communications over the serial communication port may include transmitting and/or receiving data when the serial communication port meets at least one latency metric of the communication channels. As described above, a latency metric may be a metric that corresponds to a communication channel property. In this example, the transceiver may transmit/receive data to/from another integrated circuit 102a-b when the serial communication port can at least meet (or exceed) a latency metric of all the communication channels. For example, the transceiver may transmit data when the data transfer rate of the serial communication port is at least equal to the data transfer rate latency metrics of the plurality of communication channels. In some implementations, the latency metrics may be identified in the communication standards that pertain to the communication channels.

Similarly, the transceiver may transmit data when the total bandwidth available to the serial communication port is at least equal to the bandwidth latency metric for the plurality of communication channels. In some implementations, the transceiver may transmit data independent of a buffering metric. For example, the transceiver that is transmitting data from a first communication channel may transmit data from a second communication channel, without buffering the second communication channel.

The integrated circuits 102a-b may multiplex 204 the plurality of communication channels. In some implementations, the multiplexing serial link controller 104a-b of the integrated circuits 102a-b may multiplex 204 the plurality of communication channels. As described above, the integrated circuits 102a-b may support a plurality of communications channels. For example, the integrated circuits 102a-b may receive data from a plurality of communication channels. In this example, the integrated circuits 102a-b may multiplex 204 the plurality of communication channels. The multiplexed communication channels may be transmitted over a serial communication port. In some implementations, the integrated circuits 102a-b may multiplex 204 a plurality of communication channels based on a plurality of communication standards. For example, the integrated circuits 102a-b may multiplex a first communication channel that is based on a first communication standard (e.g., a universal serial bus communication standard) with a second communication channel that is based on a second communication standard (e.g., a peripheral component interconnect express communication standard). As will be described below, the integrated circuit 102a-b may identify which communication standard applies to a communication channel based on the identification information. In some instances, the integrated circuits 102a-b may multiplex communication channels that correspond to different instances of one communication standard.

In some implementations, the integrated circuits 102a-b may demultiplex the plurality of communication channels. For example, upon reception of a multiplexed channel, an integrated circuit 102a-b may identify the different communication channels in the multiplexed channel and separate the communication channels based on the identification information.

The integrated circuits 102a-b may add 206 identification information to data from the plurality of communication channels. In some implementations, the multiplexing serial link controller 104a-b of the integrated circuits 102a-b may add 206 identification information to data from the plurality of communication channels. The identification information may enable the plurality of communication channels to share the serial communication port. As described above, the integrated circuits 102a-b may multiplex data from a plurality of communication channels. In this example, the multiplexing serial link controller 104a-b may add identification information to the data to identify a communication standard that applies to the communication channel. For example, the identification information may identify a communication channel as being based on a universal serial bus communication standard. Similarly, the identification information may identify a channel as being based on a peripheral component interconnect express communication standard. With the identification information included with the data of the communication channels, the communication channels may share the serial communication port.

In some implementations, the multiplexing serial link controller 104a-b may add 206 the identification information in a header included with the communication channel. The header may identify the communication channel as corresponding to a particular communication standard. The multiplexing serial link controller 104a-b may add 206 the identification information in a packet that is transmitted with the communication channel. In some implementations, the identification information may include protocols that may be used during transmission/reception of the communication channel.

In some implementations, the multiplexing serial link controller 104a-b may add 206 the identification information based on a routing table. The routing table may list one or more of metrics, protocols, etc. associated with the plurality of communication standards.

The integrated circuits 102a-b may also read identification information from a multiplexed channel. For instance, an integrated circuit 102a-b may receive a multiplexed channel. In this example, the multiplexing serial link controller 104a-b of an integrated circuit 102a-b may read the identification information and demultiplex the multiplexed channel accordingly. In some implementations, the multiplexing serial link controller 104a-b may use the routing table of the integrated circuit 102a-b to demultiplex the channel based on the identification information included with the multiplexed channel.

The multiplexing serial link controller 104a-b may permit 208 communication between integrated circuits 102a-b. In some implementations, the multiplexing serial link controller 104a-b may permit 208 communication between integrated circuits 102a-b that meet at least one latency metric for the plurality of communication channels when the plurality of communication channels are active. For example, a first communication channel may have a first latency metric (e.g., a data transmission rate latency metric). A second communication channel may have a second latency metric (e.g., a data transmission rate latency metric). If the link 106 between the integrated circuits 102a-b has properties that are at least equal to the sum of the first latency metric and the second latency metric (e.g., a data transmission rate that is at least equal to the sum of the first data transmission rate latency metric and the second data transmission rate latency metric), then the multiplexing serial link controller 104a-b may permit 208 communication between integrated circuits via the link 106. In other words, communication is permitted 208 when both metrics are met.

An example is given as follows. A first communication channel may include a data transmission rate latency metric of 480 megabytes per second. A second and third communication channel may include similar data transmission rate latency metrics. In this example, the multiplexing serial link controller 104a-b may permit 208 communications if the link 106 supports a data transmission rate of at least approximately 1.5 gigabytes per second (e.g., the sum of the individual latency metrics of the communication channels).

In this example, a latency metric may not include a buffer latency metric. An example is given as follows. The first communication channel may be transmitting data via the link 106 based on a first communication standard. A second communication channel may then request transmission of data via the link 106. In this example, the multiplexing serial link controller 104a-b may permit the second communication channel to transmit data if the link 106 supports a data transmission rate at least equal to the sum of the individual data transmission rate latency metrics of the first communication channel and the second communication channel. In one implementation, the second communication channel may transmit the data without buffering. In this example, the multiplexing serial link controller 104a-b may permit 208 real-time, or near real-time, communication between integrated circuits 102a-b.

In some configurations, the link 106 may meet latency metrics for communication channels that are not active.

Drawing from the example above, the second communication channel may transmit data via the link 106, if the link 106 supports a data transmission rate of at least 1.5 gigabytes per second, notwithstanding that the third communication channel is not active. In other words, in some configurations, communication may be permitted if the link 106 meets latency metrics for all communication channels, both active and non-active.

As described above, the at least one latency metric may be established by a communication standard. For example, a universal serial bus communication standard may indicate a data transmission rate latency metric for a communication channel.

Figure 3:
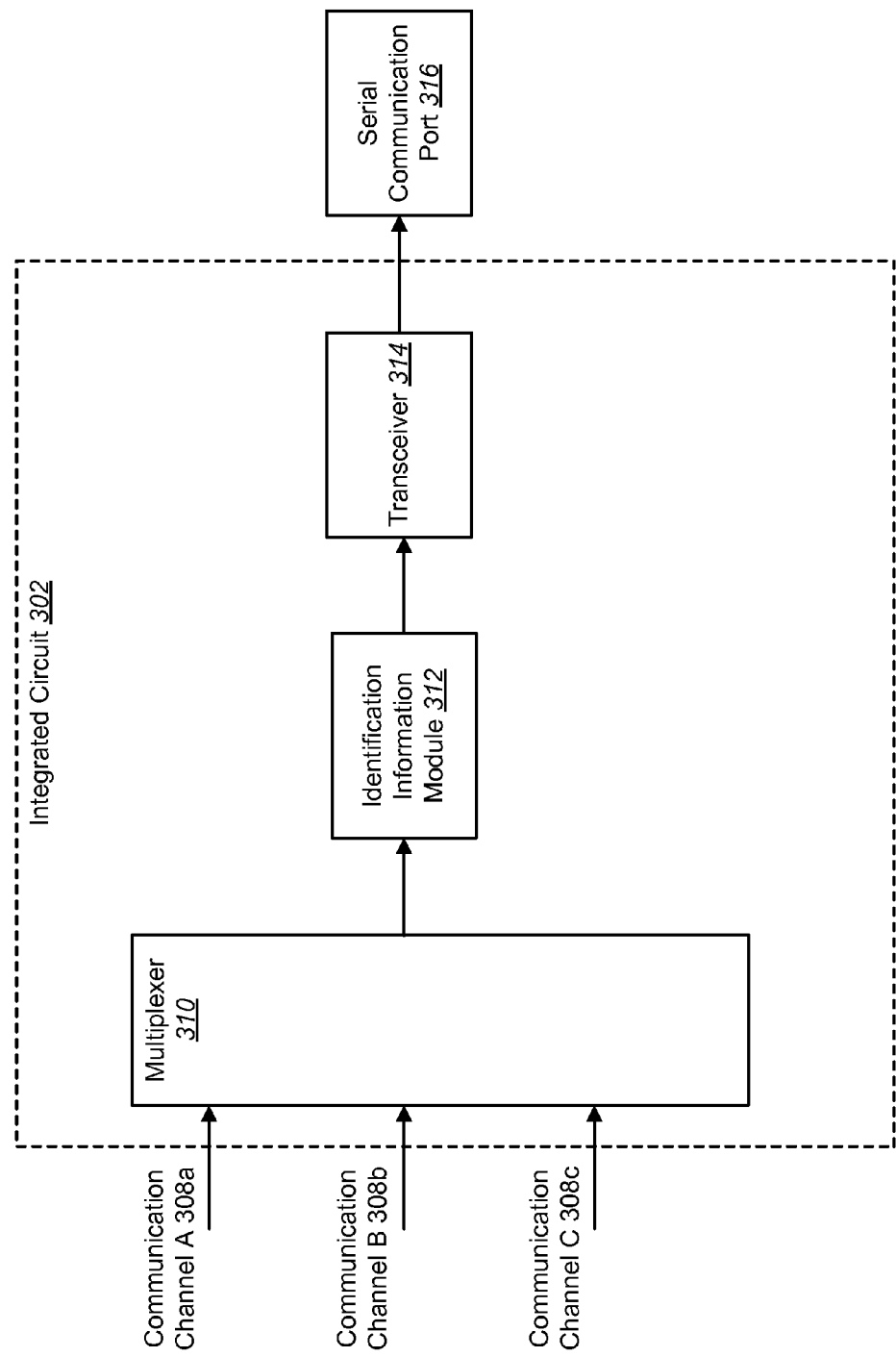
FIG. 3 is a block diagram illustrating one configuration of an integrated circuit in which systems and methods for sharing a serial communication port between a plurality of communication channels may be implemented.

FIG. 3 is a block diagram illustrating one configuration of an integrated circuit 302 in which systems and methods for sharing a serial communication port 316 between a plurality of communication channels 308a-c may be implemented. The integrated circuit 302 may be an example of the integrated circuits 102a-b described in connection with FIG. 1. The integrated circuit may include a multiplexer 310, an identification information module 312 and a transceiver 314.

The multiplexer 310 may multiplex the plurality of communication channels 308a-c. The plurality of communication channels may correspond to a plurality of communication standards. For example, communication channel A 308a may correspond to a universal serial bus communication standard, communication channel B 308b may correspond to a peripheral component interconnect express communication standard and communication channel C 308c may correspond to another instance of a universal serial bus communication standard. In this example, the multiplexed communication channels 308a-c may then share the serial communication port 316.

The identification information module 312 may be coupled to the multiplexer 310. The identification information module 312 may add identification information to the multiplexed channel. For example, the identification information module 312 may add a header to data in a multiplexed channel that identifies one of the communication channels 308a-c using the multiplexed serial link. The identification information module 312 may add identification information that identifies the communication standard that corresponds to the communication channels 308a-c. For example, the identification information module 312 may add identification information that indicates communication channel A 308a is based on a universal serial bus communication standard. In another example, the identification information module 312 may include a packet with the communication channel B 308b that indicates that communication channel B 308b is based on a peripheral component interconnect express communication standard. In some implementations, the identification information module 312 may include a routing table that assists in adding identification information to the communication channels 308a-c.

The transceiver 314 may be coupled to the identification information module 312. The transceiver 314 may manage communications to and from the integrated circuit 302. More specifically, the transceiver 314 may manage communications to and from the serial communication port 316. For example, a transmitter of the transceiver 314 may manage transmission of data from the serial communication port 316. Similarly, a receiver of the transceiver 314 may manage reception of data from the serial communication port 316. As described above, the transceiver 314 may manage communications with an integrated circuit 302 on the same electronic device. Additionally or alternatively, the transceiver 314 may manage communications with an integrated circuit 302 on another electronic device.

In some configurations, the transceiver 314 may manage a multiplexed channel comprising the plurality of communication channels 308a-c. In this example, the multiplexed channel may correspond to a plurality of wire line channels. In other configurations, the multiplexed channel may correspond to a plurality of radio frequency channels.

In some implementations, the transceiver 314 may manage communications to and from the integrated circuit 302 when the serial communication port 316 meets at least one latency metric. For example, the transmitter of the transceiver 314 may transmit a multiplexed channel when the serial communication port 316 meets the latency metrics of the communication channels 308a-c. For example, the transceiver 314 may transmit a multiplexed channel when the serial communication port 316 has a total bandwidth that is at least equal to the bandwidth latency metrics of the communication channels 308a-c.

In some implementations, the transceiver 314 may transmit/receive data corresponding to the communication channels 308a-c, independent of a buffer. For example, if the transceiver 314 is transmitting communication channel A 308a, the transceiver 314 may transmit communication channel B 308b, without buffering communication channel B 308b. In this example, the multiplexer 310 may multiplex communication channel A 308a and communication channel B 308b. The identification information module 312 may then add identification information and the transceiver 314 may transmit the multiplexed channel.

The integrated circuit 302 may be coupled to a serial communication port 316. The serial communication port 316 may be an example of the link 106 described in connection with FIG. 1. The serial communication port 316 may allow the integrated circuit 302 to transmit and receive data to and from other integrated circuits 302. For example, the transceiver 314 of the integrated circuit 302 may transmit data via the serial communication port 316. As described above, the plurality of communication channels 308a-c may share the serial communication port 316. In some implementations, the plurality of communication channels 308a-c may share the serial communication port 316 without buffering.

The serial communication port 316 may support a plurality of communication standards. For example, the serial communication port 316 may support a communication channel that is based on a universal serial bus communication standard. Similarly, the serial communication port 316 may support a communication channel that is based on a peripheral component interconnect express communication standard. In some implementations, the serial communication port 316 may transmit a multiplexed channel. For example, the serial communication port 316 may transmit a multiplexed channel comprising a first communication channel based on a universal serial bus communication standard and a second communication channel based on a peripheral component interconnect express communication standard.

In some configurations, the serial communication port 316 may meet latency metrics for the communication channels 308a-c that are not active. For example, communication channel B 308b may transmit via the serial communication port 316, if the serial communication port 316 supports a data transmission rate at least equal to the data transmission rate latency metric of the communication channels 308a-c, notwithstanding that communication channel C 308c is not actively transmitting data.

Figure 4:
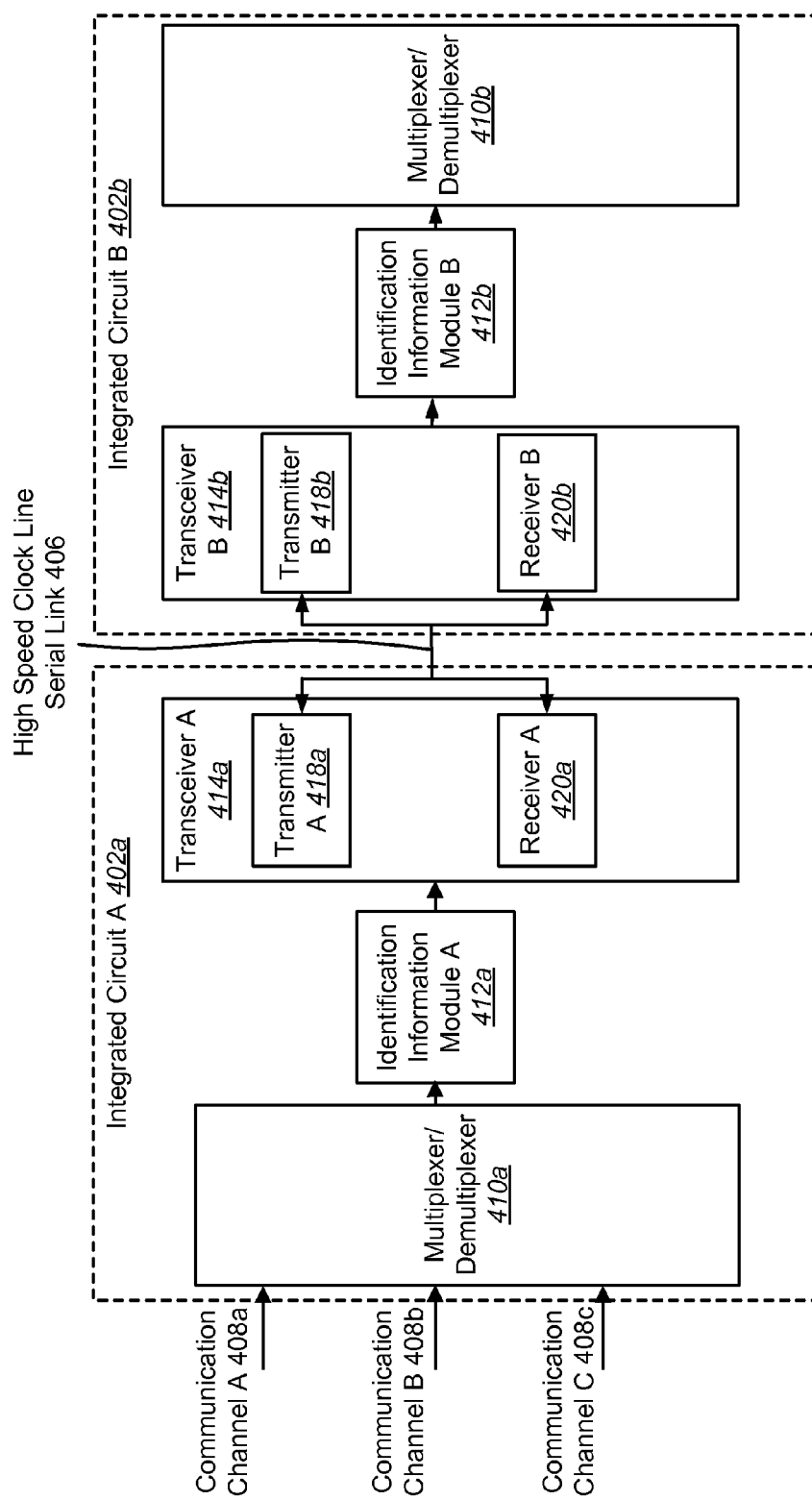
FIG. 4 is a block diagram illustrating another configuration of integrated circuits in which systems and methods for sharing a serial communication port between a plurality of communication channels may be implemented.

FIG. 4 is a block diagram illustrating another configuration of integrated circuits 402a-b in which systems and methods for sharing a serial communication port between a plurality of communication channels 408a-c may be implemented. The integrated circuits 402a-b may be examples of the integrated circuits described earlier. The integrated circuits 402a-b may each include a multiplexer/demultiplexer 410a-b, an identification information module 412a-b and a transceiver 414a-b that may be examples of corresponding elements described earlier. In one configuration, the first multiplexer/demultiplexer 410a in integrated circuit A 402a may receive and multiplex a plurality of communication channels 408a-c that may be examples of the communication channels described earlier.

In some implementations the transceivers 414a-b may group together at least one transmitter 418a-b and at least one receiver 420a-b. In this example, the transmitter A 418a may manage transmission of data over a high speed clock line serial link 406 to receiver B 420b.

In some implementations, the transmitters 418a-b and the receivers 420a-b may transmit and receive data to and from another integrated circuit 402a-b on the same electronic device, for example in a chip-to-chip configuration. The transmitters 418a-b and the receivers 420a-b may transmit and receive data to and from an integrated circuit 402a-b on another electronic device. The transmitters 418a-b and the receivers 420a-b may transmit/receive multiplexed channels. For example, the transmitters 418a-b may transmit a multiplexed channel that comprises communication channel A 408a that is based on a universal serial bus communication standard and communication channel B 408b that is based on a peripheral component interconnect express communication standard.

In some implementations, the integrated circuits 402a-b may be connected by a high speed clock line serial link 406. The high speed clock line serial link 406 may be an example of the link 106 described in connection with FIG. 1. The high speed clock line serial link 406 may connect the integrated circuits 402a-b through serial communication ports coupled to the integrated circuits 402a-b.

In some implementations, the identification information modules 412a-b may read identification information. For example, receiver B 420b of transceiver B 414b may receive a multiplexed channel received from integrated circuit A 402a. The multiplexed channel may include the communication channels 408a-c. In this example, receiver B 420b may send the multiplexed channel to identification information module B 412b. Identification information module B 412b may read the identification information from the multiplexed channel. As described above, the identification information may identify a communication channel as pertaining to a particular communication standard. The identification information modules 412a-b may read the identification information from a header included with the data. For example, identification information module B 412b may read a header that indicates that communication channel A 408a of the multiplexed channel is based on a universal serial bus communication standard.

In other examples, the identification information modules 412a-b may unpack a packet included with the data, wherein the packet contains the identification information. For example, identification information module B 412b may unpack a packet that includes information that indicates communication channel B 408b is based on a peripheral component interconnect express communication standard.

In some implementations, the identification information modules 412a-b may use a routing table to identify the communication.

A second multiplexer/demultiplexer 410b may be coupled to the identification information modules B 412b. Based on the identification information read by the identification information module B 412b, the second multiplexer/demultiplexer 410b may demultiplex the multiplexed channel. For example, identification information module B 412b may identify the plurality of communication channels 408a-c included in a multiplexed channel, and the second multiplexer/demultiplexer 410b may demultiplex (e.g., separate) the individual communication channels 408a-c. After the second multiplexer/demultiplexer 410b has demultiplexed the communication channels 408a-c, integrated circuit B 402b may process the communication channels 408a-c based on the communication standards. For example, the second multiplexer/demultiplexer 410b may demultiplex communication channel A 408a based on a universal serial bus communication standard. Integrated circuit B 402b may further process the data from communication channel A 408a based on the universal serial bus communication standard. Similarly, the second multiplexer/demultiplexer 410b may demultiplex communication channel B 408b based on a peripheral component interconnect express communication standard. Integrated circuit B 402b may further process the data from communication channel B 408b based on the peripheral component interconnect express communication standard. Furthermore, communication may be bi-directional. For example, instead of sending data from integrated circuit A 402a to integrated circuit B 402b, data may flow from integrated circuit B 402b to integrated circuit A 402a, i.e., via transmitter B 418b and receiver A 420a.

Figure 5:
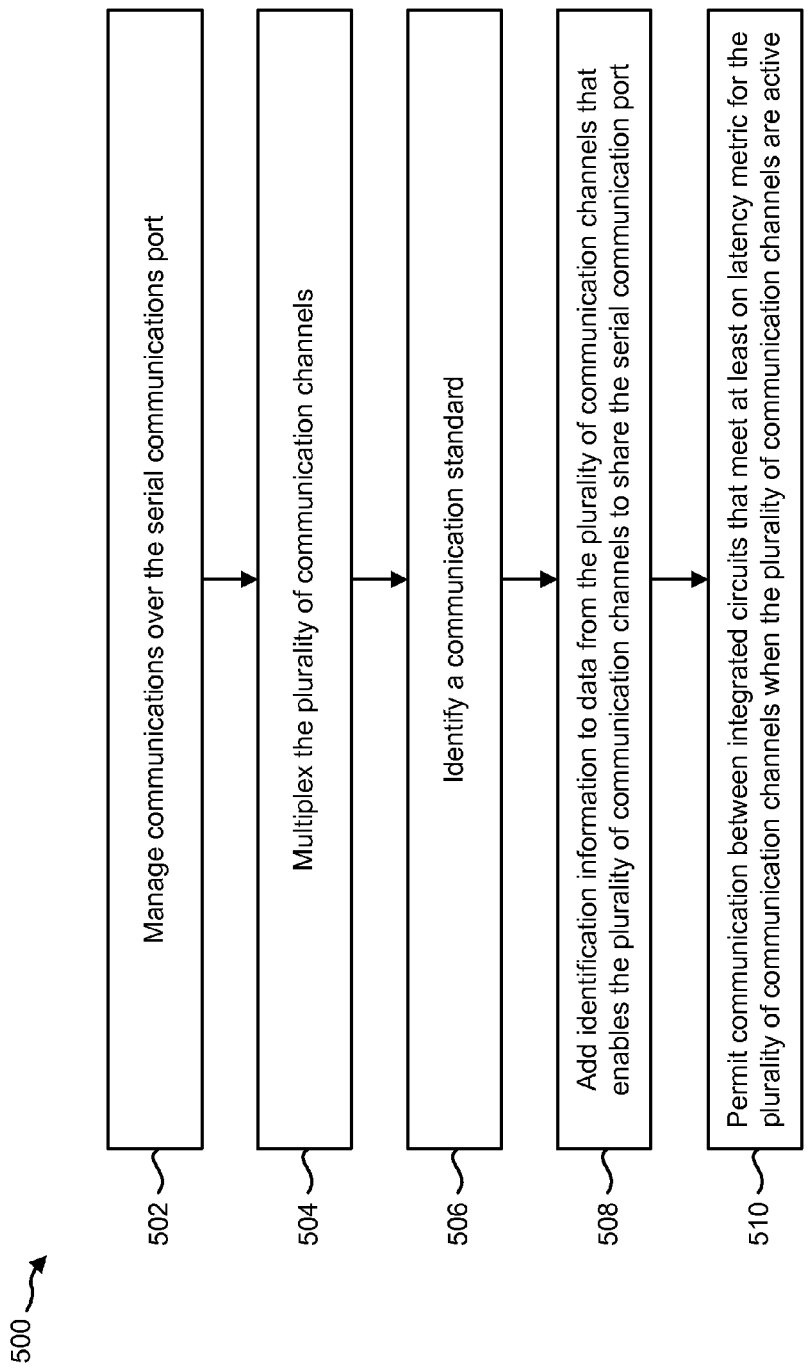
FIG. 5 is a flow diagram illustrating another configuration of a method for sharing a serial communication port between a plurality of communication channels.

FIG. 5 is a flow diagram illustrating another configuration of a method 500 for sharing a serial communication port between a plurality of communication channels. The method may be performed by the integrated circuits 102a-b. The integrated circuits 102a-b may manage 502 communications over the serial communication port. In some implementations, this may be done as described in connection with FIG. 2.

The integrated circuits 102a-b may multiplex 504 a plurality of communication channels. In some implementations, this may be done as described in connection with FIG. 2.

The integrated circuits 102a-b may identify 506 a communication standard. In some implementations, the identification information modules 312a-b may identify 506 a communication standard. More specifically, the identification information modules 312a-b may identify 506 a communication standard that pertains to a particular communication channel. For example, the integrated circuits 102a-b may identify that a universal serial bus communication standard applies to a first communication channel. With the communication standard identified, the integrated circuits 102a-b may add 508 identification information to data from the plurality of communication channels that enables the plurality of communication channels to share the serial communication port. In some implementations, this may be done as described in connection with FIG. 2.

The integrated circuits 102a-b may permit 510 communication between integrated circuits 102a-b that meet at least one latency metric for the plurality of communication channels when the plurality of communication channels are active. In some implementations, this may be done as described in connection with FIG. 2.

Figure 6:
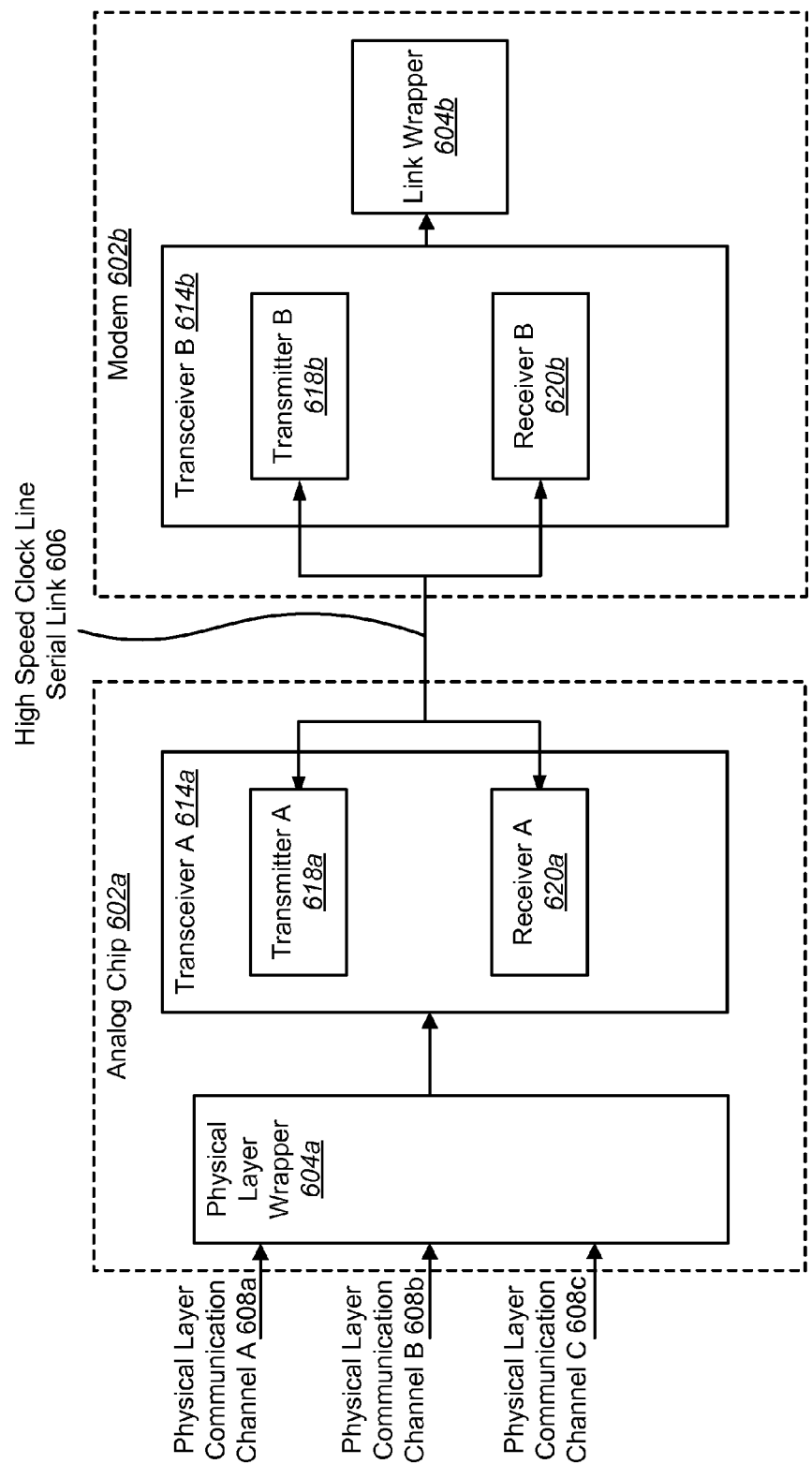
FIG. 6 is a block diagram illustrating one configuration of an analog chip and a modem in which systems and methods for sharing a serial communication port between a plurality of communication channels may be implemented.

FIG. 6 is a block diagram illustrating one configuration of an analog chip 602a and a modem 602b in which systems and methods for sharing a serial communication port between a plurality of communication channels may be implemented. The analog chip 602a may be an example of the integrated circuits 102a-b described earlier. In some implementations the analog chip 602a may be a wireless communication chip. The modem 602b may be an example of the integrated circuits 102a-b described earlier. In some implementations, the analog chip 602a and the modem 602b may be coupled together by a high speed clock line serial link 606 similar to corresponding elements described above. The analog chip 602a and the modem 602b may include a transceiver 614a-b that may be an example of the transceiver described earlier. The transceivers 614a-b may include at least one transmitter 618a-b and at least one receiver 620a-b that may be examples of corresponding elements described earlier.

The analog chip 602a may include a physical layer wrapper 604a that may be coupled to the transceiver 614a-b. The physical layer wrapper 604a may receive a plurality of communication channels 608a-c that may be examples of communication channels described earlier. The physical layer wrapper 604a may include all, or part of the functionality of the multiplexing serial link controller, multiplexer, identification information module and demultiplexer discussed earlier. For example, the physical layer wrapper 604a may multiplex the plurality of communication channels 608a-c and may add identification information to the data in the communication channels 608a-c.

The modem 602b may include a link wrapper 604b that may be coupled to the transceiver 614a-b. The link wrapper 604b may receive a multiplexed channel from the transceiver 614a-b. The link wrapper 604b may include all, or part of the functionality of the multiplexing serial link controller, multiplexer, identification information module and demultiplexer discussed previously. For example, the link wrapper 604b may read identification information included in a multiplexed channel and may demultiplex the communication channels based on the identification information.

FIG. 7A is a block diagram illustrating one configuration of transmitter circuitry in which systems and methods for sharing a serial communication port between a plurality of communication channels may be implemented. The transmitter circuitry may be implemented in the transmitters described earlier. In one implementation, the circuitry may include a serializer 722. The serializer 722 may receive data input 730 and a phase-locked loop clock input 732. The data input 730 may be the multiplexed channel described earlier. In one implementation, the phase-locked loop clock input 732 may include a negative and positive component. The phase-locked loop clock input 732 may pass through a phase-locked loop clock buffer before passing to the serializer 722. The serializer 722 may convert the data into a serialized format.

The serializer 722 may pass the serialized data to a retiming flip-flop 724. In some implementations, the retiming flip-flop 724 may receive the phase-locked loop clock input 732 in addition to the serialized data. The retiming flip-flop 724 may store state information relating to the received input. The retiming flip-flop 724 may pass the data to a pre-driver 726. The pre-driver 726 may then pass the data to a differential driver 728.

FIG. 7B illustrates one configuration of a differential driver 728. In one example, the differential driver 728 may include a current mode driver, i.e., termination resistor. The differential driver 728 may also include a voltage driver, i.e., termination resistor. In this example the latency for the transmission path may be approximately eight bits.

Figure 8:
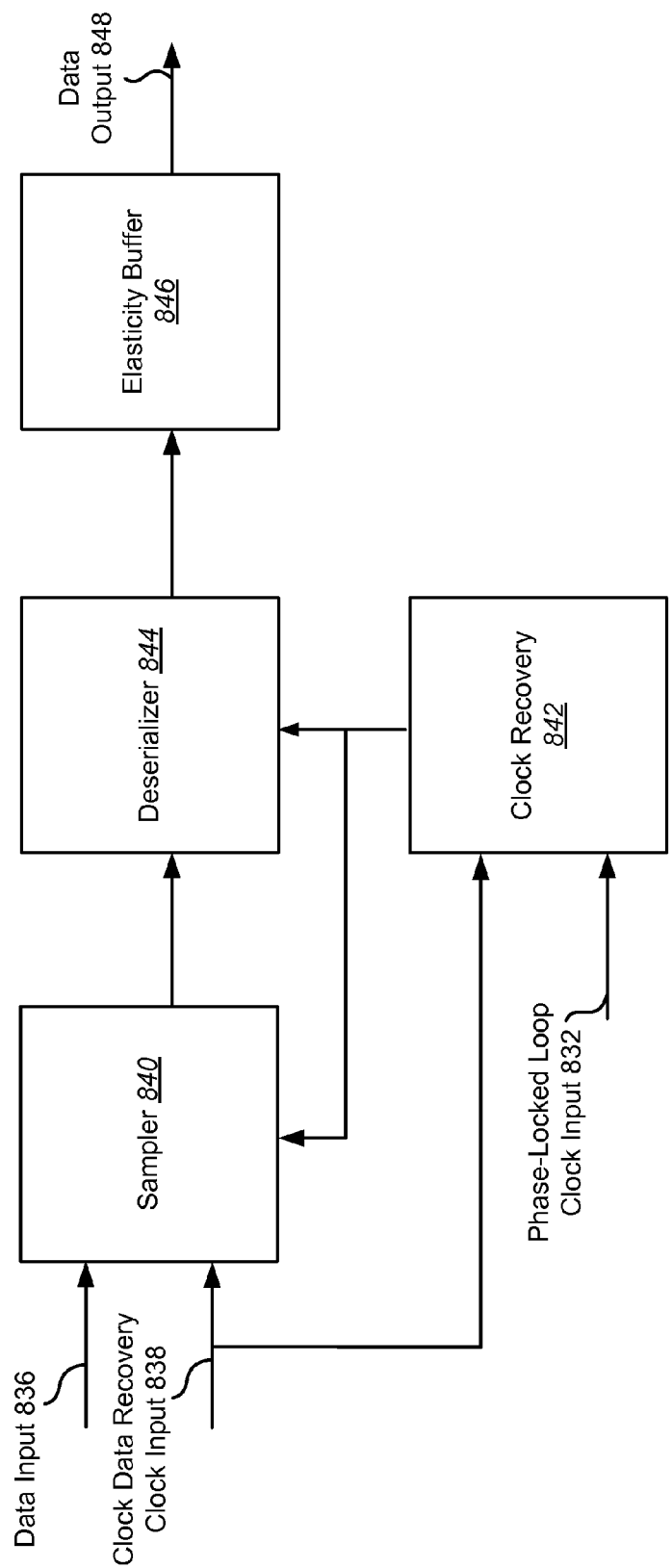
FIG. 8 is a block diagram illustrating one configuration of receiver circuitry in which systems and methods for sharing a serial communication port between a plurality of communication channels may be implemented.

FIG. 8 is a block diagram illustrating one configuration of receiver circuitry in which systems and methods for sharing a serial communication port between a plurality of communication channels may be implemented. The receiver circuitry may be implemented in the receivers described earlier. A sampler 840 may receive a data input 836 and a clock data recovery clock input 838. In some implementations the data input 836 may be the multiplexed channel described earlier. In some implementations, the data input 836 may include a positive and a negative component. Similarly, the clock rata recovery clock input 838 may include a positive and negative component. The sampler may also receive the output from a clock recovery module 842.

The clock recovery module 842 may receive the clock data recovery clock input. The clock recovery module 842 may also receive a phase-locked loop clock input 832 similar to the phase-locked loop clock input 732 described in connection with FIG. 7.

In some implementations the sampler 840 may send the data to a deserializer 844. Similarly, the clock recovery module 842 may send the data to the deserializer 844. The deserializer 844 may process the received data and send the results to an elasticity buffer 846. In some examples, the elasticity buffer 846 may de-skew multiple lanes and may compensate for short term phase-locked loop drift. The elasticity buffer 846 may then send the data output 848 to the integrated circuit. In some implementations, the latency for the receiver circuitry may be approximately 94 bits.

Figure 9:
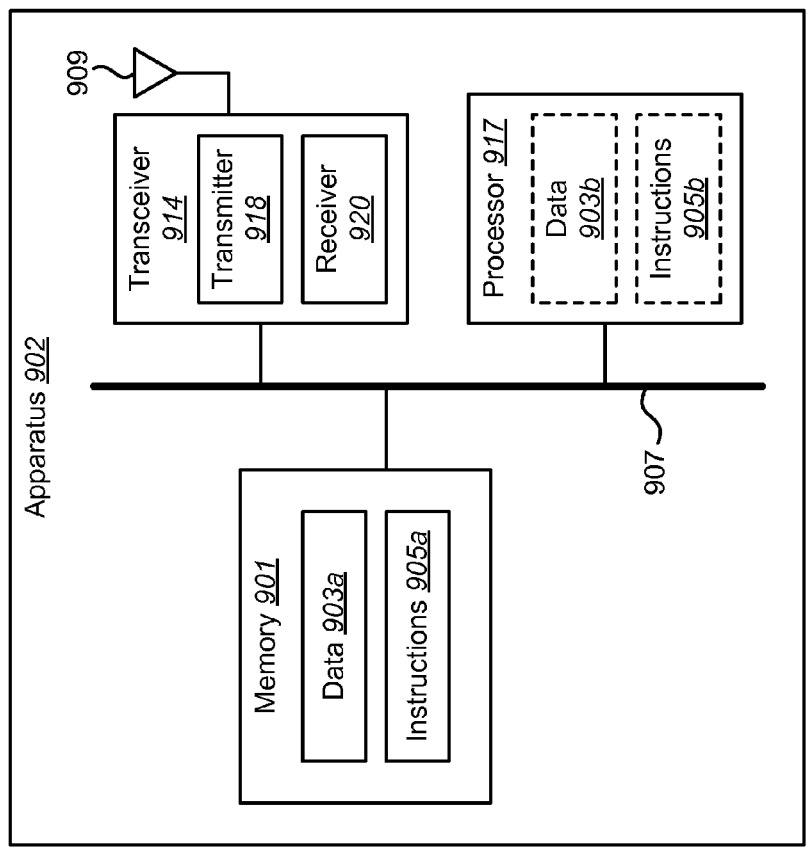
FIG. 9 illustrates certain components that may be included within an apparatus.

FIG. 9 illustrates certain components that may be included within an apparatus 902. In some configurations, one or more of the integrated circuits described herein may be implemented in accordance with the apparatus 902 illustrated in FIG. 9.

The apparatus 902 includes a processor 917. The processor 917 may be a general purpose single- or multi-chip microprocessor (e.g., an ARM), a special purpose microprocessor (e.g., a digital signal processor (DSP)), a microcontroller, a programmable gate array, etc. The processor 917 may be referred to as a central processing unit (CPU). Although just a single processor 917 is shown in the apparatus 902 of FIG. 9, in an alternative configuration, a combination of processors 917 (e.g., an ARM and DSP) could be used.

The apparatus 902 also includes memory 901 in electronic communication with the processor 917 (e.g., the processor 917 can read information from and/or write information to the memory 901). The memory 901 may be any electronic component capable of storing electronic information. The memory 901 may be random access memory (RAM), read-only memory (ROM), magnetic disk storage media, optical storage media, flash memory devices in RAM, on-board memory included with the processor 917, programmable read-only memory (PROM), erasable programmable read-only memory (EPROM), electrically erasable PROM (EEPROM), registers and so forth, including combinations thereof.

Data 903a and instructions 905a may be stored in the memory 901. The instructions 905a may include one or more programs, routines, sub-routines, functions, procedures, code, etc. The instructions 905a may include a single computer-readable statement or many computer-readable statements. The instructions 905a may be executable by the processor 917 to implement one or more of the methods or functions described herein. Executing the instructions 905a may involve the use of the data 903a that is stored in the memory 901. FIG. 9 shows some instructions 905b and data 903b being loaded into the processor 917 (which may come from instructions 905a and data 903a in memory 901).

The apparatus 902 may also include a transmitter 918 and a receiver 920 to allow transmission and reception of signals between the apparatus 902 and a remote location (e.g., another wireless communication device, etc.). The transmitter 918 and receiver 920 may be collectively referred to as a transceiver 914. An antenna 909 may be electrically coupled to the transceiver 914. The apparatus 902 may also include (not shown) multiple transmitters 918, multiple receivers 920, multiple transceivers 914 and/or multiple antenna 909.

The various components of the apparatus 902 may be coupled together by one or more buses, which may include a power bus, a control signal bus, a status signal bus, a data bus, etc. For simplicity, the various buses are illustrated in FIG. 9 as a bus system 907.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The techniques described herein may be used for various communication systems, including communication systems that are based on an orthogonal multiplexing scheme. Examples of such communication systems include orthogonal frequency division multiple access (OFDMA) systems, single-carrier frequency division multiple access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The foregoing presentation of the described configurations is provided to enable any person skilled in the art to make or use the methods and other structures disclosed herein. The flowcharts, flow diagrams, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is noted that the various methods disclosed herein (e.g., methods and other methods disclosed by way of description of the operation of the various apparatus described herein) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

In one or more exemplary embodiments, the operations described herein may be implemented in hardware, software, firmware or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, include compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

Further, it should be appreciated that modules and/or other appropriate means for performing the methods and techniques described herein, such as those illustrated by FIGS. 2 and 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus for sharing a serial communication port between a plurality of communication channels, comprising:
a transceiver that manages communications over the serial communication port;
a multiplexer coupled to the transceiver, wherein the multiplexer multiplexes the plurality of communication channels; and
identification information circuitry coupled to the multiplexer, wherein the identification information circuitry adds identification information to data from the plurality of communication channels that enables the plurality of communication channels to share the serial communication port;
wherein the serial communication port and the multiplexer permit bi-directional communication between a modem in the apparatus and an analog chip in the apparatus coupled together by a high-speed clock line serial link that meet at least one latency metric for the plurality of communication channels when each of the plurality of communication channels is active.

2. The apparatus of claim 1, wherein the apparatus is positioned on an integrated circuit.

3. The apparatus of claim 1, wherein each of the plurality of communication channels is a wire line channel.

4. The apparatus of claim 1, wherein the plurality of communication channels corresponds to a plurality of serial communication standards, and wherein the plurality of serial communication standards comprises a universal serial bus communication standard and a peripheral component interconnect express communication standard.

5. The apparatus of claim 4, wherein the identification information identifies which serial communication standard of the plurality of serial communication standards corresponds to each communication channel of the plurality of communication channels.

6. The apparatus of claim 1, wherein the plurality of communication channels corresponds to a plurality of instances of a communication standard.

7. The apparatus of claim 1, wherein the plurality of communication channels corresponds to physical layer standards.

8. The apparatus of claim 1, wherein the at least one latency metric includes a metric for determining whether an integrated circuit transmits data, wherein the metric corresponds to a communication channel property.

9. The apparatus of claim 8, wherein the integrated circuit transmits data when the communication channel property is greater than the metric.

10. The apparatus of claim 1, wherein the at least one latency metric includes a bandwidth metric.

11. The apparatus of claim 1, wherein the at least one latency metric includes a data transfer rate metric.

12. The apparatus of claim 1, wherein the at least one latency metric does not include a buffering metric.

13. The apparatus of claim 1, wherein the integrated circuits are in a chip-to-chip configuration.

14. A method for sharing a serial communication port between a plurality of communication channels by an apparatus, comprising:
    managing communications over the serial communication port;
    multiplexing the plurality of communication channels;
    adding identification information to data from the plurality of communication channels that enables the plurality of communication channels to share the serial communication port; and
    permitting bi-directional communication between a modem in the apparatus and an analog chip in the apparatus coupled together by a high-speed clock line serial link that meet at least one latency metric for the plurality of communication channels when each of the plurality of communication channels is active.

15. The method of claim 14, wherein the apparatus is positioned on an integrated circuit.

16. The method of claim 14, wherein each of the plurality of communication channels is a wire line channel.

17. The method of claim 14, wherein the plurality of communication channels corresponds to a plurality of communication standards.

18. The method of claim 14, wherein the plurality of communication channels corresponds to a plurality of instances of a communication standard.

19. The method of claim 14, wherein the plurality of communication channels corresponds to physical layer standards.

20. The method of claim 14, further comprising identifying a communication standard.

21. The method of claim 14, wherein the at least one latency metric includes a metric for determining whether an integrated circuit transmits data, wherein the metric corresponds to a communication channel property.

22. The method of claim 21, further comprising transmitting data when the communication channel property is greater than the metric.

23. The method of claim 14, wherein the at least one latency metric includes a bandwidth metric.

24. The method of claim 14, wherein the at least one latency metric includes a data transfer rate metric.

25. The method of claim 14, wherein the at least one latency metric does not include a buffering metric.

26. The method of claim 14, wherein the integrated circuits are in a chip-to-chip configuration.

27. A computer-program product for sharing a serial communication port between a plurality of communication channels, comprising a non-transitory tangible computer-readable medium having instructions thereon, the instructions comprising:
    code for causing an apparatus to manage communications over the serial communication port;
    code for causing the apparatus to multiplex the plurality of communication channels;
    code for causing the apparatus to add identification information to data from the plurality of communication channels that enables the plurality of communication channels to share the serial communication port; and
    code for causing the apparatus to permit bi-directional communication between a modem in the apparatus and an analog chip in the apparatus coupled together by a high-speed clock line serial link that meet at least one latency metric for the plurality of communication channels when each of the plurality of communication channels is active.

28. The computer-program product of claim 27, wherein the plurality of communication channels corresponds to a plurality of communication standards.

29. The computer-program product of claim 27, wherein the plurality of communication channels corresponds to a plurality of instances of a communication standard.

30. The computer-program product of claim 27, wherein the plurality of communication channels corresponds to physical layer standards.

31. The computer-program product of claim 27, wherein the instructions further comprise code for causing the apparatus to identify a communication standard.

32. The computer-program product of claim 27, wherein the at least one latency metric includes a metric for determining whether an integrated circuit transmits data, wherein the metric corresponds to a communication channel property.

33. The computer-program product of claim 32, wherein the instructions further comprise code for causing the apparatus to transmit data when the communication channel property is greater than the metric.

34. The computer-program product of claim 27, wherein the at least one latency metric does not include a buffering metric.

35. An apparatus for sharing a serial communication port between a plurality of communication channels, comprising:
    means for managing communications over the serial communication port;
    means for multiplexing the plurality of communication channels;
    means for adding identification information to data from the plurality of communication channels that enables the plurality of communication channels to share the serial communication port; and
    means for permitting bi-directional communication between a modem in the apparatus and an analog chip in the apparatus coupled together by a high-speed clock line serial link that meet at least one latency metric for the plurality of communication channels when each of the plurality of communication channels is active.

36. The apparatus of claim 35, wherein the plurality of communication channels corresponds to a plurality of communication standards.

37. The apparatus of claim 35, wherein the plurality of communication channels corresponds to a plurality of instances of a communication standard.

38. The apparatus of claim 35, wherein the plurality of communication channels corresponds to physical layer standards.

39. The apparatus of claim 35, further comprising means for identifying a communication standard.

40. The apparatus of claim 35, wherein the at least one latency metric includes a metric for determining whether an integrated circuit transmits data, wherein the metric corresponds to a communication channel property.

41. The apparatus of claim 40, further comprising means for transmitting data when the communication channel property is greater than the metric.

42. The apparatus of claim 35, wherein the at least one latency metric does not include a buffering metric.

* * * * *